United States Patent [19]
van Gastel

[11] 3,901,069
[45] Aug. 26, 1975

[54] VISCOSIMETER

[75] Inventor: Leonard A. van Gastel, Nieuw Loosdrecht, Netherlands

[73] Assignee: Stichting Instituut Voor Grafische Techniek Tno, Amsterdam-O, Netherlands

[22] Filed: July 29, 1974

[21] Appl. No.: 492,922

[30] Foreign Application Priority Data
July 31, 1973  Netherlands....................... 7310556

[52] U.S. Cl.......................... 73/58; 73/60; 73/150 R
[51] Int. Cl. ........................................... G01n 11/00
[58] Field of Search .............. 73/58, 60, 150 R, 9, 7

[56] References Cited
UNITED STATES PATENTS

| | | | |
|---|---|---|---|
| 2,101,322 | 12/1937 | Reed....................................... | 73/58 |
| 2,993,371 | 7/1961 | Greubel ............................ | 73/150 R |
| 3,442,121 | 5/1969 | Wirz................................. | 73/150 R |
| 3,516,289 | 6/1970 | MacGeorge........................ | 73/150 R |
| 3,531,986 | 10/1970 | van Gastel........................ | 73/150 R |

FOREIGN PATENTS OR APPLICATIONS

| | | | |
|---|---|---|---|
| 1,001,129 | 8/1965 | United Kingdom............... | 73/150 R |
| 1,042,018 | 9/1966 | United Kingdom............... | 73/150 R |

*Primary Examiner*—Jerry W. Myracle
*Assistant Examiner*—Joseph W. Roskos
*Attorney, Agent, or Firm*—Spencer & Kaye

[57] ABSTRACT

In a device for determining the viscosity of a substance whereby a measuring roller is brought in rolling contact with an axially reciprocating distributing roller provided with a uniform film of the liquid substance, and a cylindrical measuring roller, having a shaft suspended for free rotation between the ends of two bearing members fixedly connected with a frame, is brought in rolling contact with the distributing roller and the lateral force occurring in the measuring roller is measured.

7 Claims, 2 Drawing Figures

PATENTED AUG 26 1975 3,901,069

VISCOSIMETER

BACKGROUND OF THE INVENTION

The invention relates to a device for determining the viscosity of a liquid substance and includes one or more driven distributing rollers for this liquid substance and a measuring roller, which is brought in rolling contact with a distributing roller, and which is provided with a uniform film of the liquid substance. The displacement of the measuring roller is then measured.

With such a device the shear stress and the liquid flow caused by it can be determined from flow diagrams as viscosity.

This determination, however, is insufficient to control a liquid substance, which, with the aid of a system of distributing rollers, has to be applied as a uniform thin layer onto a certain substrate.

Examples of such a process are, for instance, the production of coated paper, the printing of paper, the application of a protective coating, the application of adhesive layers, etc.

In such processes, not only the shear stresses, but also the divisional forces in the layer of liquid play an important part.

It is known in the art to measure the divisional forces in the layers of liquid from roller to roller with a tack meter.

With a tack meter the force is measured with which a small roller, brought in rolling contact with a distributing roller for a liquid, is taken along by the tack alongside the periphery of the distributing roller.

The signal obtained by this arrangement is not particularly strong and should be reinforced electronically.

It is the object of the invention to provide a viscosimeter, with which the combination of the shear force and the divisional force can be measured such as this occurs in a layer of liquid that is situated between rotating rollers.

SUMMARY OF THE INVENTION

The invention is characterized in that a cylindrical measuring roller with its shaft is suspended freely rotating between the ends of two bearing members fixedly connected with a frame, and in that the measuring roller can be brought in rolling contact with a distributing roller reciprocation in the axial direction and means are provided to enable measuring of the lateral force occurring in the measuring roller.

The device according to the invention has the advantage that the combined interplay of force mechanisms of shear and divisional forces is measured, such as this occurs in practice with the rotating and reciprocating movements in the systems of distributing rollers.

The device according to the invention has, furthermore, the surprising advantage that such a powerful signal is obtained that electronical reinforcement is not necessary. If necessary, a simple spring tension meter may suffice.

In the practical systems of distributing rollers for the liquid substance, at least one of these rollers is moved to and fro in order to prevent the formation of rings of liquid to thus obtain an evenly distributed layer of liquid.

Consequently, the present distributing roller moving to and fro axially can with advantage belong to the system of distributing rollers in a device for processing a liquid substance.

Besides that the viscosimeter according to the invention is simple and robust of construction, it is by virtue of its simple construction adaptable to substantially each system of distributing rollers for liquid, provided at least one of the distributing rollers moves axially and is accessible in such a way that the measuring cylinder of the viscosimeter can be brought in rolling contact with it.

Furthermore, the viscosimeter is reliable and thus malfunctioning is very unlikely to occur.

The measuring system itself has no internal friction in axial direction. Furthermore, it covers a large range of viscosities without any need for re-adjusting or adjusting.

Finally, the powerful signal can, in a simple way, be converted into an electric signal for the adjustment and controlling of a production machine.

When in practice one works with liquid substances whose rheological properties are constant, the device according to the invention can be applied for measuring and adjusting the thickness of the layer of the liquid.

It is noted that in the periodical Product Engineering, dated 17th June, 1968 on page 86 a viscosimeter is described according to the W. H. Hoppmann II principle, consisting of a glass tube suspended from two springing supports and in which a second reciprocating tube is provided. The liquid to be investigated is introduced into the clearance between the two tubes; the axial displacement of the outer tube with respect to the inner tube is a measure for the viscosity of the liquid. A division of the layer of liquid is, however, not possible, even if the inner tube also rotates.

It is exactly this type of tack information that is obtained with the viscosimeter according to the invention and that is of such great importance for the result of the transfer of a liquid onto a substrate.

BRIEF DESCRIPTION OF DRAWING

Figure 1:
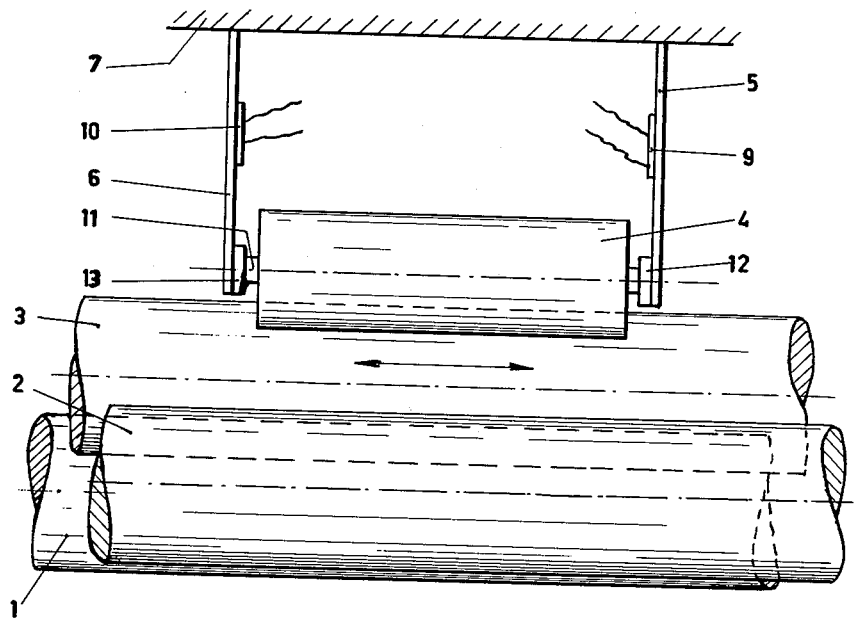

In it:

FIG. 1 is a front elevational view of a viscosimeter according to a preferred embodiment of the invention.

Figure 2:
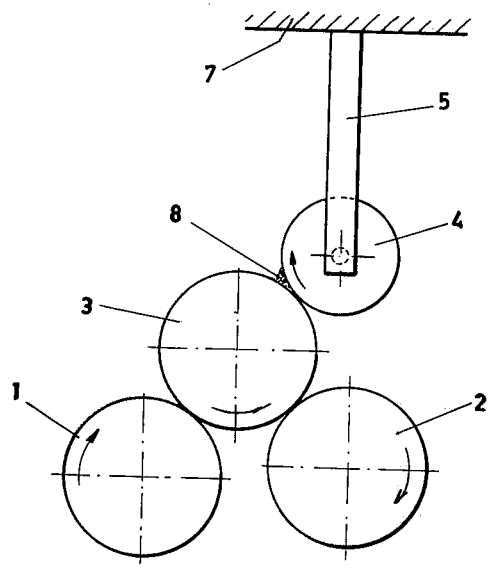

FIG. 2 a side elevational view of the same embodiment.

DESCRIPTION OF THE PREFERRED EMBODIMENT

Rollers 1, 2 and 3 shown in FIG. 1 form a system of distributing rollers for liquid. As it is known in the art, one of the rollers 1 and 2 is driven. The roller 3 can execute an axial reciprocating movement to effect an even distribution of the liquid and to prevent the formation of rings of liquid. There is further provided a cylindrical measuring roller 4 which can rotate freely. Its shaft 11 is supported in bearings 12 and 13 provided at the ends of bearing carrier members 5 and 6, respectively. In the given embodiment these bearing carrier members 5 and 6 are constructed as plate springs which are fixedly connected with a frame 7.

FIG. 2 illustrates the situation in which the measuring roller 4, after the liquid has been distributed in a regular film over the surfaces of distributing rollers 1, 2 and 3, is brought in rolling contact with the distributing roller 3. The layer of liquid between the measuring roller 4 and the distributing roller 3 causes the measuring roller 4 to rotate, so that at the location indicated at 8, threads of liquid and divisional forces in the liquid, appear, while, as it has been stated before, the distributing roller 3 also carries out a movement to and fro.

In the process, in the measuring roller 4 great lateral forces are generated. With a liquid of 1,000 poise in case of a measuring roller with a length of 14 cm a force of 1,000 g was measured.

This lateral force also occurs in bearing carrier members 5 and 6 for the measuring roller 4. In the embodiment according to FIG. 1, therefore, the bearing carrier members 5 and 6 are provided with strain gauges 9, 10 respectively, with the aid of which the lateral force can be conventionally converted into an electric signal.

Because of the sufficiently larger value of the lateral force generated in the measuring roller 4, instead of strain gauges, the magnitude of this force may be measured with the aid of, for instance, a spring tension meter.

I claim:

1. A device for determining the viscosity of a liquid substance, comprising in combination
    a. a distributing roller being, during operation, at least indirectly in contact with the liquid for providing a liquid film on said distributing roller;
    b. means for axially reciprocating said distributing roller;
    c. a cylindrical measuring roller;
    d. support means for freely rotatably holding said measuring roller in contact with the reciprocating distributing roller; and
    e. sensor means at least indirectly in contact with said measuring roller for measuring the axial forces generated in said measuring roller by the sliding contact with said reciprocating distributing roller.

2. A device as defined in claim 1, further comprising a frame member; said measuring roller having a shaft; said support means including bearings in which said shaft journals; and bearing carrier members supporting said bearings and attached to said frame member.

3. A device as defined in claim 2, said sensor means being attached to said bearing carrier members.

4. A device as defined in claim 1, there being provided a plurality of distributing rollers in contact with one another; means for rotating at least one of said distributing rollers; one of said distributing rollers being the axially reciprocating distributing roller.

5. A device as defined in claim 1, wherein said sensor means includes strain gauges.

6. A device as defined in claim 5, wherein the axially reciprocating distributing roller belongs to a system of distributing rollers in a device for processing a liquid substance.

7. A device as defined in claim 1, wherein said sensor means includes a spring tension meter.

* * * * *